March 4, 1969  J. R. BYERS  3,430,490
DEPTHOMETER
Filed Jan. 27, 1965
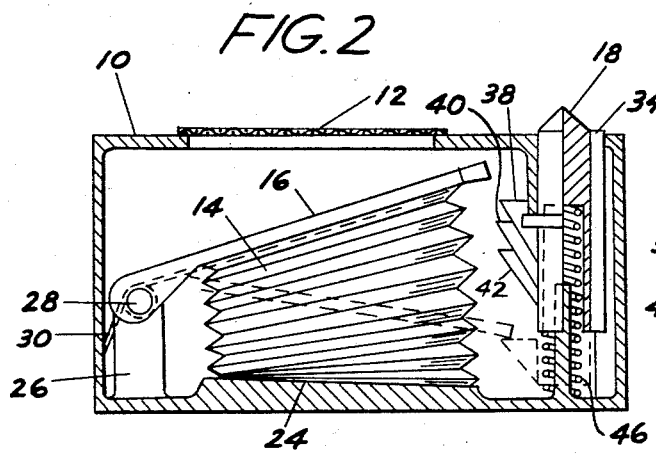
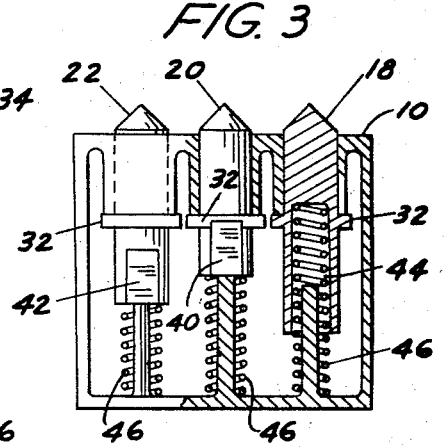
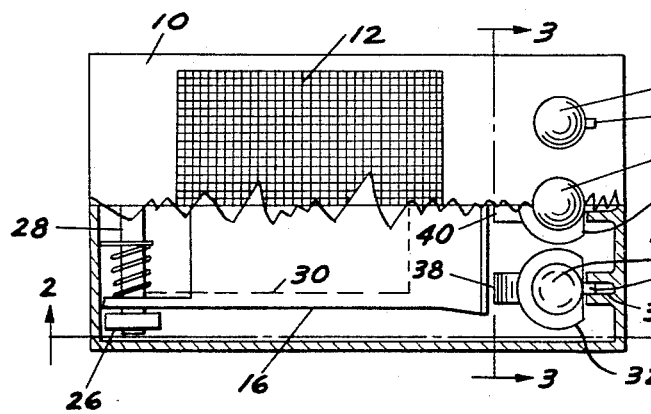
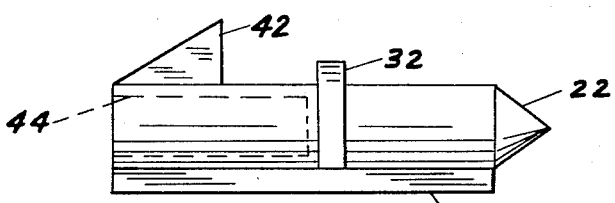
JOHN R. BYERS
INVENTOR.
BY H. M. Saragovitz
E. J. Kelly
H. Berl
ATTORNEYS

United States Patent Office 3,430,490
Patented Mar. 4, 1969

3,430,490
DEPTHOMETER
John R. Byers, Thu Dau Mot, Vietnam, assignor to the United States of America as represented by the Secretary of the Army
Filed Jan. 27, 1965, Ser. No. 428,584
U.S. Cl. 73—300                                6 Claims
Int. Cl. G01f 23/00, 23/16, 23/14

The invention herein may be manufactured and used by or for the Government of the United States of America for governmental purposes without the payment of any royalties thereon or therefor.

The present invention relates to depthometers and more particularly to depthometers wherein depth is indicated by retractable plungers.

Prior art devices are generally of the visual dial indicating type, which are virtually impossible to read at night or in muddy water without some source of illumination. Certain bodies of water, especially in the spring of the year, are extremely muddy, thereby rendering dial type indicators useless as a depth indicating means even with some source of illumination.

During combat operations, speed is essential in hasty river crossings. Current main battle tanks are now being tested with various snorkel kits to permit almost immediate river crossings. The river bottom must be reconnoitered, however, to locate possible hazards or obstacles to the submerged tanks. One of the facts that must be determined is the depth of the water since the maximum depth acceptable with current snorkel designs is 15 feet. However, present depthometers of the visible gauge type are not satisfactory for use in muddy water or in darkness, two conditions that prevail in tactical river crossings. Tactical situations will normally preclude the use of surface equipment and require scuba reconnaissance teams. The pointed, protruding plunger tips of this device enable a diver to determine river or lake bottom depth even though darkness or muddy water prevents use of visual means. In cold weather when wet suit mittens might be worn by the diver, the plunger tips could be counted by scraping a knife blade across the depthometer. This device fulfills an urgent requirement for pre-fording underwater reconnaissance of inland waterways.

The depth indicator as set forth in the present invention utilizes retractable plungers thereby eliminating the need for illumination since an indication of depth is perceived by touch rather than sight.

An object of the present invention is the provision of a depthometer providing a positive indication of depth without additional illumination.

Another object is to provide a depthometer which gives a positive indication of depth at night or in muddy water by touch rather than by visual means.

A final object of the present invention is the provision of a depthometer, simple and rugged in construction, giving a positive indication of water depth under all water anl weather conditions.

Other objects and advantages of the invention will hereinafter become more fully apparent from the following description of the annexed drawing, which illustrates a preferred embodiment and wherein:

FIG. 1 is a plan view of the invention having broken away portions and portions in section.

FIG. 2 is a vertical section taken along line 2—2 of FIG. 1.

FIG. 3 is a vertical section showing plunger detail and taken along line 3—3 of FIG. 1.

FIG. 4 is a detailed view of the plungers of FIG. 1.

The invention is a depth indicating device wherein a number of retractable plungers are actuated by a bellows and arm arrangement. The depth indication is perceived by feel, and the amount each plunger is retracted into the main body portion is an indication of that depth.

Referring now to the drawings in detail, wherein like reference characters designate like or corresponding parts throughout the several views, there is shown in FIG. 1 a body or housing member 10, generally rectangular in shape, hollow in form, and made of plastic, but which can be made of any suitable material and fabricated in any shape. At the top of and joined to body 10, is a screen type member 12, made of perforated plastic, wire or similar material, admitting water into the hollow interior of body 10 thereby actuating sealed bellows 14 due to the pressure change.

Bellows 14 has attached thereto a plate member 16 which may be made of plastic, metal or the like. Member 16 is attached to sealed bellows 14, by bonding or some similar convenient manner, and will therefore move downwardly when outside pressure acting on bellows 14 collapses the bellows, thereby depressing indicating plungers 18, 20 and 22. The plate 16 and bellows 14 are held at the required distance from the indicating plungers by attachment of the bellows to body member 10, at 24, and by trunnions 26 and pin member 28. The attachment of the bellows at 24, is accomplished by bonding, welding, or the like. Spring 30 holds plate 16 in the extended position and also returns the plate and bellows to the extended position.

Indicator plungers 18, 20 and 22 are held in body member 10 by stop lugs 32 and are prevented from rotating within body 10 by guides 34 sliding in grooves 36. Each plunger member has a depress lug 38, 40 and 42 thereon, with the lugs staggered in a stair configuration with respect to each other, and which are sequentially engaged by plate 16, with lug 38 on plunger 18 being closest to the top of body 10 thereby first to be actuated by plate 16. Each plunger has a cavity 44 therein, with a spring 46 disposed in the cavity. The spring and cavity arrangement keeps each plunger in an extended position above the top surface of body 10.

FIG. 4 is a detailed illustration of one indicator plunger showing guide member 34, stop lug 32, and the depress lug in greater detail.

In operation, the present invention is carried into water or the like, wherein the water pressure overcomes the pressure within the bellows and the resistance of the bellows opening spring 30. As the bellows collapses, plate 16 rotates about pin 28 and engages depress lug 38 on plunger 18 wherein the plunger is retracted into body member 10, giving an indication of the depth of water. As the device is taken into deeper water, the bellows collapses further whereby plate 16 engages the second depress lug 40 on plunger 20 retracting plunger 20 as well as the first plunger 18 into body 10 thereby providing an indication of the depth of the deeper water. As is set forth in the instant invention, three retractable indicating plungers are used, generally giving indications of depths of 8, 12 and 15 feet. It is understood however, that a number of plungers could be used giving depth indications of any given range of depths, the necessary requirement being to equate spring resistance, pressure, friction loss, and angular-linear movement.

Obviously, many modifications and variations of the present invention are possible in the light of the above teachings. It is therefore to be understood, that within the scope of the appended claims, the invention may be practiced otherwise than as specifically described.

I claim:
1. In a depthometer comprising:
   a generally rectangular body;
   said body having an opening therein allowing ingress and egress of fluid;

perforated means covering the opening in said body; retractable indicators slidably mounted in said body; means for holding said retractable indicators above said body in an extended position; pressure responsive means within said body; and means on said indicators for engagement with said pressure responsive means, whereby upon said pressure responsive means being activated by fluid flow into the body through the opening in said body, the means on said indicators are engaged, retracting said indicators into said body in a sequential manner providing depth indications.

2. The apparatus as set forth in claim 1 wherein the means for holding the indicators above said body comprises an integral stop lug on said indicators and springs within said indicators and in engagement with the bottom of said body, providing tension for holding the integral stop lug against depending fingers in said body.

3. The apparatus as set forth in claim 1 wherein the pressure means within the body comprises a bellows attached to the bottom of said body and held in an extended position by a trunnion mounted activating finger and spring.

4. The apparatus as set forth in claim 1 wherein the means on each of said indicators for engagement with said pressure means comprises a lug, wherein each lug is in a stepped relationship to the adjacent lug and projects into said body toward said pressure means.

5. In a depth indicating device comprising:
a body member having a passage therein;
retractable members in said body;
pressure responsive means also within said body; and
means on said retractable members for engagement with said pressure responsive means, whereby upon said pressure responsive means being activated by fluid into the body, the means on said indicators are engaged, retracting said retractable members, indicating depth.

6. The apparatus as set forth in claim 5 wherein said pressure responsive means retracts said retractable members into said body in a sequential manner.

References Cited

UNITED STATES PATENTS 3,187,572   6/1965   Harland _____ 73—300 X

FOREIGN PATENTS 136,497   3/1880   France.

S. CLEMENT SWISHER, *Primary Examiner.*